(12) United States Patent
Sapir et al.

(10) Patent No.: US 12,106,176 B2
(45) Date of Patent: Oct. 1, 2024

(54) TRUE SECURE AIRGAP

(71) Applicant: EMC IP Holding Company LLC, Hopkinton, MA (US)

(72) Inventors: Stav Sapir, Beer Sheva (IL); Naor Radami, Shokeda (IL); Jehuda Shemer, Kfar Saba (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 366 days.

(21) Appl. No.: 17/305,968

(22) Filed: Jul. 19, 2021

(65) Prior Publication Data
US 2023/0012696 A1    Jan. 19, 2023

(51) Int. Cl.
| | |
|---|---|
| G06F 21/57 | (2013.01) |
| G06F 21/55 | (2013.01) |
| G06F 21/60 | (2013.01) |
| G06F 21/64 | (2013.01) |
| G06K 7/10 | (2006.01) |
| G06K 7/14 | (2006.01) |
| H04L 9/30 | (2006.01) |
| H04L 9/32 | (2006.01) |

(52) U.S. Cl.
CPC ....... G06K 7/10722 (2013.01); G06F 21/552 (2013.01); G06F 21/57 (2013.01); G06F 21/602 (2013.01); G06F 21/64 (2013.01); G06K 7/1413 (2013.01); G06K 7/1417 (2013.01); H04L 9/30 (2013.01); H04L 9/3247 (2013.01); G06F 2221/034 (2013.01)

(58) Field of Classification Search
CPC ..... G06F 21/57; G06F 21/64; G06F 2221/034
See application file for complete search history.

(56) References Cited

U.S. PATENT DOCUMENTS

| | | | | |
|---|---|---|---|---|
| 9,331,856 | B1* | 5/2016 | Song | G06F 21/36 |
| 11,032,131 | B1* | 6/2021 | Franceschetti | G06F 21/606 |
| 2014/0085056 | A1 | 3/2014 | Kong | |
| 2014/0230071 | A1* | 8/2014 | Adam | G16H 40/63 |
| | | | | 726/26 |

(Continued)

FOREIGN PATENT DOCUMENTS

| | | |
|---|---|---|
| CN | 110896401 A | 3/2020 |
| WO | 2013/046231 A1 | 4/2013 |

OTHER PUBLICATIONS

Anonymous Transmit data using a set of QR codes between two devices which are physically isolated Nov. 2, 2020 IPCOM000264028D (Year: 2020).*

*Primary Examiner* — David J Pearson
(74) *Attorney, Agent, or Firm* — Workman Nydegger (57) ABSTRACT

Techniques for securely monitoring an air-gapped machine. Systems, methods, and devices for generating a status message representing a state of an air-gapped machine, converting the status message to a visual code, displaying the visual code to a display monitor connected to the air-gapped machine, capturing image data of the visual code at a camera connected to a monitoring machine, and transmitting the image data to the monitoring machine, thereby causing the visual code to be accessible by a user of the monitoring machine. Techniques for verifying the integrity of the status message, and optionally, encrypting the status message.

16 Claims, 8 Drawing Sheets

(56) References Cited

U.S. PATENT DOCUMENTS

| | | | |
|---|---|---|---|
| 2015/0264057 A1* | 9/2015 | Mevec | H04L 63/123 |
| | | | 726/22 |
| 2015/0356306 A1* | 12/2015 | Carter | G06F 21/64 |
| | | | 380/246 |
| 2016/0011921 A1 | 1/2016 | Rao et al. | |
| 2016/0140429 A1* | 5/2016 | Glosser | G07C 5/12 |
| | | | 702/185 |
| 2016/0241583 A1* | 8/2016 | Kowalczyk | H04L 63/20 |
| 2018/0109631 A1* | 4/2018 | Ekambaram | H04L 67/02 |
| 2018/0232391 A1 | 8/2018 | Goldberg et al. | |
| 2019/0042819 A1* | 2/2019 | Agarwal | G05B 19/41835 |
| 2020/0238591 A1* | 7/2020 | Höllriegl | G01N 21/9081 |
| 2022/0129886 A1* | 4/2022 | Du | H04L 9/0894 |
| 2023/0013242 A1* | 1/2023 | Crooks | G06Q 20/202 |
| 2023/0252169 A1* | 8/2023 | Savir | H04L 9/0825 |
| | | | 726/26 |
| 2023/0342762 A1* | 10/2023 | Shamai | G06Q 20/065 |

* cited by examiner

TRUE SECURE AIRGAP

FIELD OF THE INVENTION

Embodiments of the present invention generally relate to air-gapped machines. More particularly, at least some embodiments of the invention relate to systems, hardware, software, computer-readable media, and methods for providing a secure manner to monitor air-gapped machines.

BACKGROUND

Air-gapped machines are typically computing systems or servers that are physically disconnected (air gap open) from other machines or a network, thus preventing attempts for remote attack against the air-gapped machine. The air gap is closed only for short intervals at needed times, such as to transfer backup data. Once the task is complete, the airgap is promptly opened. A popular use for airgaps is in electronic voting machines. Electronic voting machines provide users with an interface display through which they cast their vote, but the machines are disconnected from networks to prevent voter tampering. Thus, the votes are stored until the designated time to transfer the records.

A problem with airgaps arises when the air-gapped machines need routine or emergency maintenance. In order to get the status of the machine to identify if there is a problem, a user must physically close the airgap (connect the machine to an administrator machine) or connect to the air-gapped machine remotely. If there is not a maintenance issue with the air-gapped machine, then the instance of closing the airgap was not needed and left the air-gapped machine unnecessarily vulnerable to an outside attack. Another problem arises when malicious attackers attempt to falsify outputs or status to give incorrect results, thereby tricking an administrator into closing the airgap to deal with the observed issue. What is needed, therefore is an improved mechanism for monitoring the status of an air-gapped machine and determining if the airgap actually needs to be closed to address a status error.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments disclosed herein relate to methods, systems, and devices (e.g., computing systems, computing appliances and devices, hardware storage devices, wearable devices, etc.) for providing a secure manner to monitor air-gapped machines. More particularly, disclosed embodiments are directed to methods, systems, and devices, for cryptographically signing and/or optionally asymmetrically encrypting status messages and communicating them using a visual code in order to display a status of the air-gapped machine without closing the airgap. In configurations where administrative users are stationed remotely and in other configurations, a camera is added to the true secure airgap system allowing the administrative users the ability to view the status of the air-gapped machine remotely.

Disclosed embodiments are directed to securely monitoring an air-gapped machine. For example, systems, methods, and devices are provided for generating a status message representing a state, status, or other condition of an air-gapped machine and converting the status message to a visual code. After converting the status message to the visual code, a computing system displays the visual code on a display monitor connected to the air-gapped machine. Image data of the visual code is captured by a camera connected to a monitoring machine then transmitted to the monitoring machine, thereby causing the visual code to be accessible by a user of the monitoring machine.

Disclosed embodiments are also directed to cryptographically signing the status message using a private key stored on the air-gapped machine such that the visual code includes the status message and a private key signature. Subsequent to transmitting the image data to the monitoring machine, the private key signature is verified using a public key stored on the monitoring machine. Some embodiments are directed to encrypting the status message using an encryption key stored on the air-gapped machine, wherein subsequent to transmitting the image data to the monitoring machine, the status message included in the visual code is decrypted using a decryption key stored on the monitoring machine.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements. The disclosed embodiments bring about real and substantial benefits to the technical field. Specifically, the disclosed embodiments relate to techniques for efficient and secure monitoring of air-gapped machines, which in turn beneficially facilitates an increase in computer, network, and data security.

For example, disclosed embodiments provide for a way to get a status update of an air-gapped machine and identify if there is a problem with the air-gapped machine without having to close the airgap and connect the air-gapped machine to an administrator machine or corresponding network. Because the status can be checked without closing the airgap, this mitigates the number of times the airgap is closed and significantly increases the security of the air-gapped machine. The fewer number of times the airgap is closed, the fewer number of times the air-gapped machine is left open to malicious attacks. Additionally, the status is ascertainable by a remote administrator, offering a streamlined and efficient approach to monitoring the air-gapped machine or a plurality of air-gapped machines, such as in the applications of computer backup systems and voting machines.

In some embodiments, because the camera that is used to capture the visual code is positioned outside of a secure environment that houses the air-gapped machine, the camera is completely separated from the air-gapped machine, thereby improving system security. In other embodiments, where the camera is stationed inside the secure environment, there are also benefits to positioning the camera inside the secure environment that is less vulnerable to the camera being tampered with.

Furthermore, because of the cryptographic signature of the status message, an administrator is able to verify that the status message originated with the air-gapped machine and was not tampered with. Because of this, an administrator is able to identify when malicious attackers have attempted to falsify outputs or status messages to give incorrect status updates of the air-gapped machine which might induce an administrator into closing the airgap to fix a false issue.

Additionally, because the status message is converted to a visual code, a bystander or malicious attacker will not immediately be able to ascertain the status of the air-gapped machine. The visual code is further secured when it is encrypted by a public key that is decryptable only by an administrator's private key. Accordingly, these and numerous other benefits will be described in more detail throughout the remaining portions of this disclosure.

Air-Gapped Machines

Figure 1:
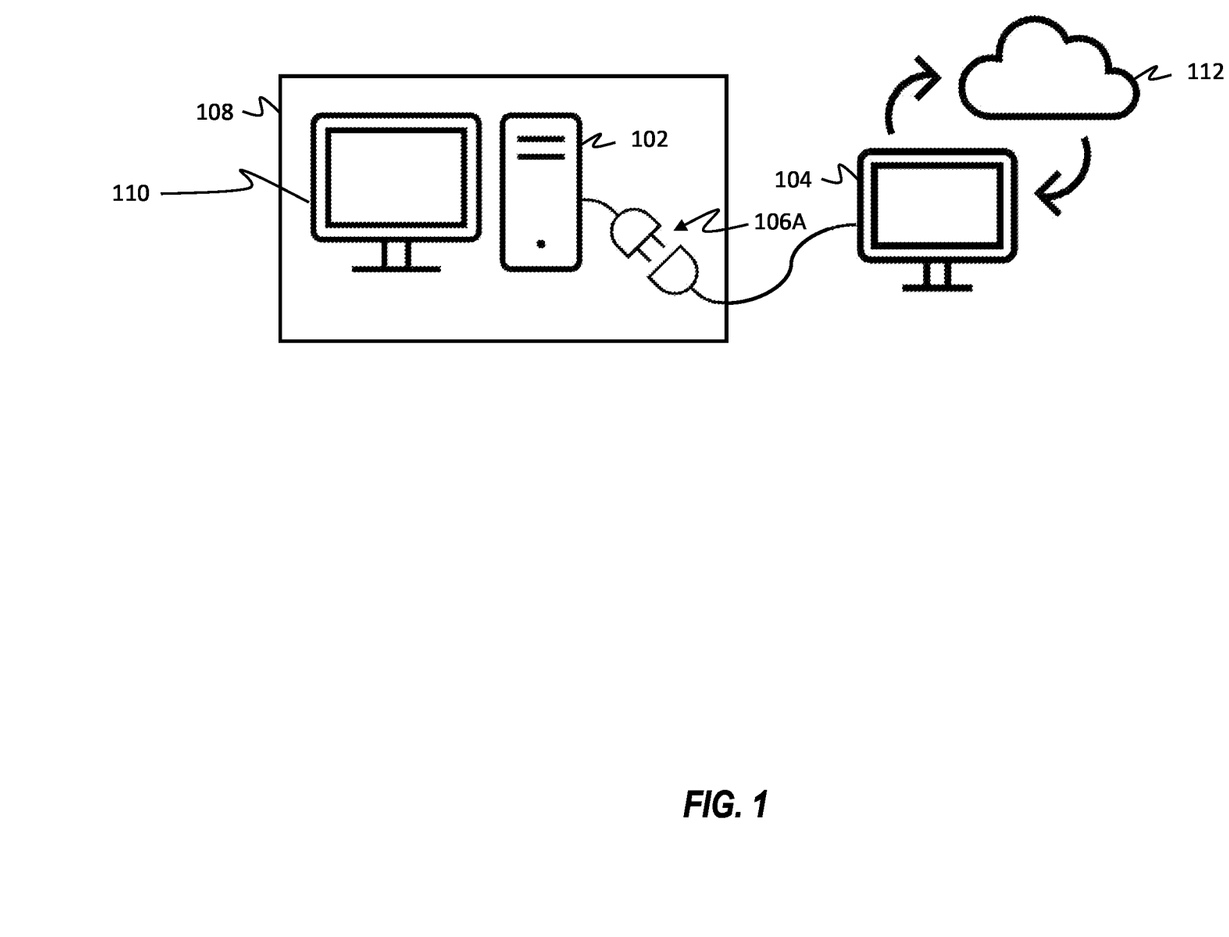
FIG. 1 illustrates a machine conventionally air-gapped with a network device.

Attention will now be directed to FIG. 1, which illustrates a machine conventionally air-gapped to a network device. As shown in FIG. 1, an air-gapped machine 102 (i.e., computing device, computer, server, etc.) is disconnected from a user machine 104 using an airgap 106A. The airgap 106A is shown as disconnected. Typically, air-gapped machines are isolated from outside users via a physical or other type of barrier (e.g., barrier 108) to prevent unwanted persons or devices from accessing the air-gapped machine. Sometimes, the air-gapped machine 102 has a display 110 (i.e., monitor, user interface, user portal) whereby a user can directly access the air-gapped machine for observation or configuration.

In some cases, the airgap 106A is a physical airgap providing means for the physical disconnection (i.e., unplugging) from a wired connection to an outside device (e.g., user machine 104). In some cases, the airgap 106A is an airgap configured to provide means for the disconnection of the air-gapped machine 102 from a user machine 104 via a remote access connection or network connection. The airgap 106A serves to protect the air-gapped machine 102 from attacks by isolating the air-gapped machine from the user machine 104, which may also be connected to a network 112 (e.g., a cloud network or a network of a plurality of additional user machines). The connection of the user machine 104 to a network 112 compounds the risk of a malicious attack on the air-gapped machine 102.

Figure 2:
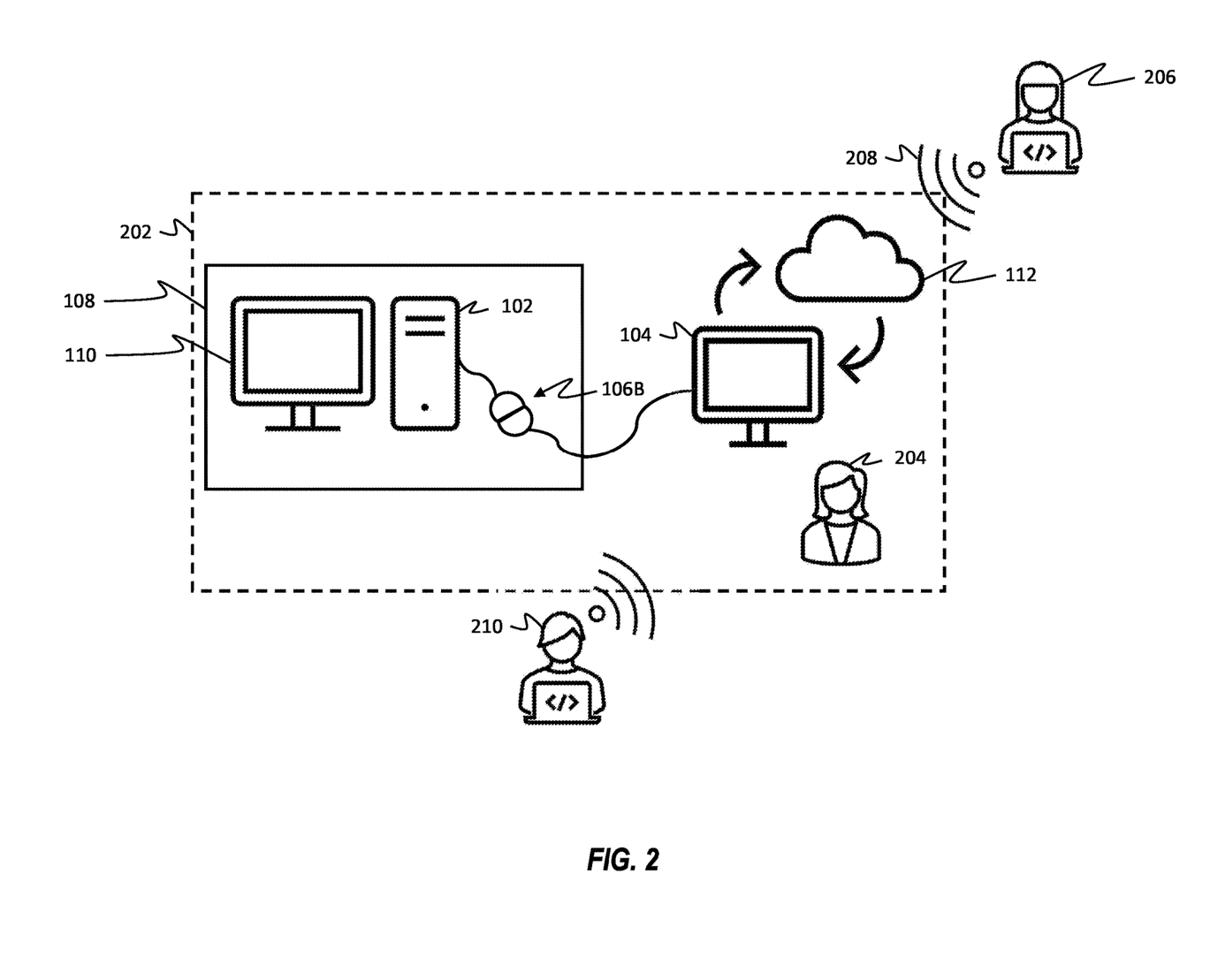
FIG. 2 illustrates various malicious and non-malicious attempts to access the air-gapped machine once the airgap is closed.

Attention will now be directed to FIG. 2, which illustrates various points of access to an air-gapped machine 102 when the airgap is closed. For example, airgap 106B is shown being connected (i.e., closed) wherein the user machine 104 now has access to the air-gapped machine 102. While the air-gapped machine 102 is isolated from the user machine 104 and other network access points (e.g., network 112), it is beneficial to also isolate the user machine 104 via a physical or network barrier (e.g., barrier 202), such as a firewall, to prevent unauthorized/unwanted users from accessing the user machine 104, and then, in turn, accessing the air-gapped machine 102.

At one point of access, a user (e.g., user 204) is able to pass through the barrier 202 to access the user machine 104. At another point of access, a user (e.g., user 206, user) is able to access the user machine 104 using a remote connection 208. However, when the airgap 106B is closed, this leaves the air-gapped machine 102 vulnerable to outside attacks. For example, a malicious attacker 210 may try to access either the user machine 104 (to access the air-gapped machine 102 indirectly) or try to access the air-gapped machine 102 directly since any remote connection requires protocol handshakes that provide opportunities for such attacks. Even when the airgap 106B is disconnected, a malicious attacker 210 may tamper with the air-gapped machine 102 in order to produce a status error that would induce an administrative or maintenance user to close the airgap, thereby providing the malicious attacker 210 with an opportunity to access the air-gapped machine 102. Disclosed embodiments are directed to systems, methods, and devices that mitigate such risks of malicious attacks.

True Secure Airgap System

Figure 3A:
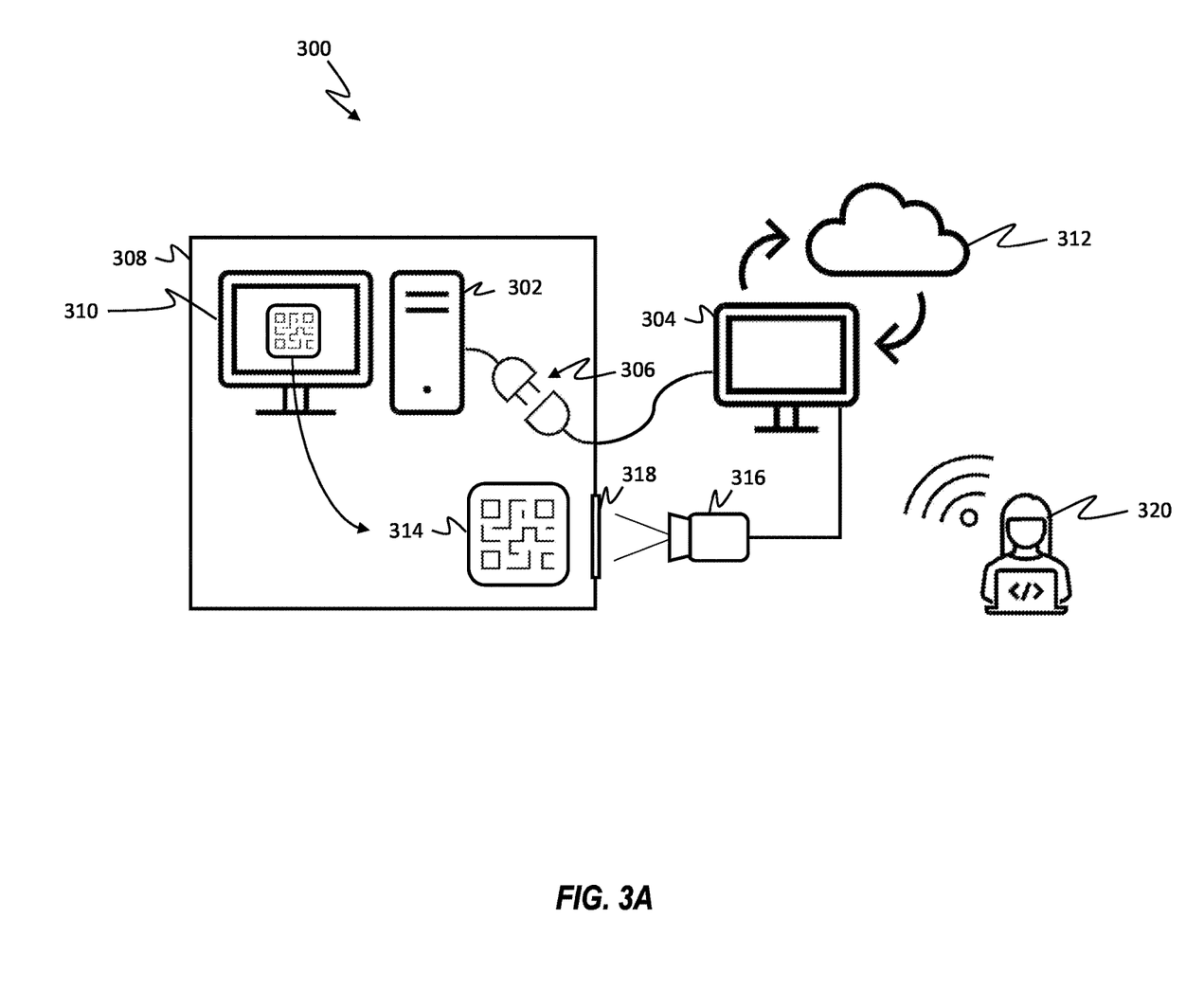
FIGS. 3A and 3B illustrate an example embodiment of monitoring the status of an air-gapped machine utilizing a camera and a corresponding visual code.
Figure 3B:
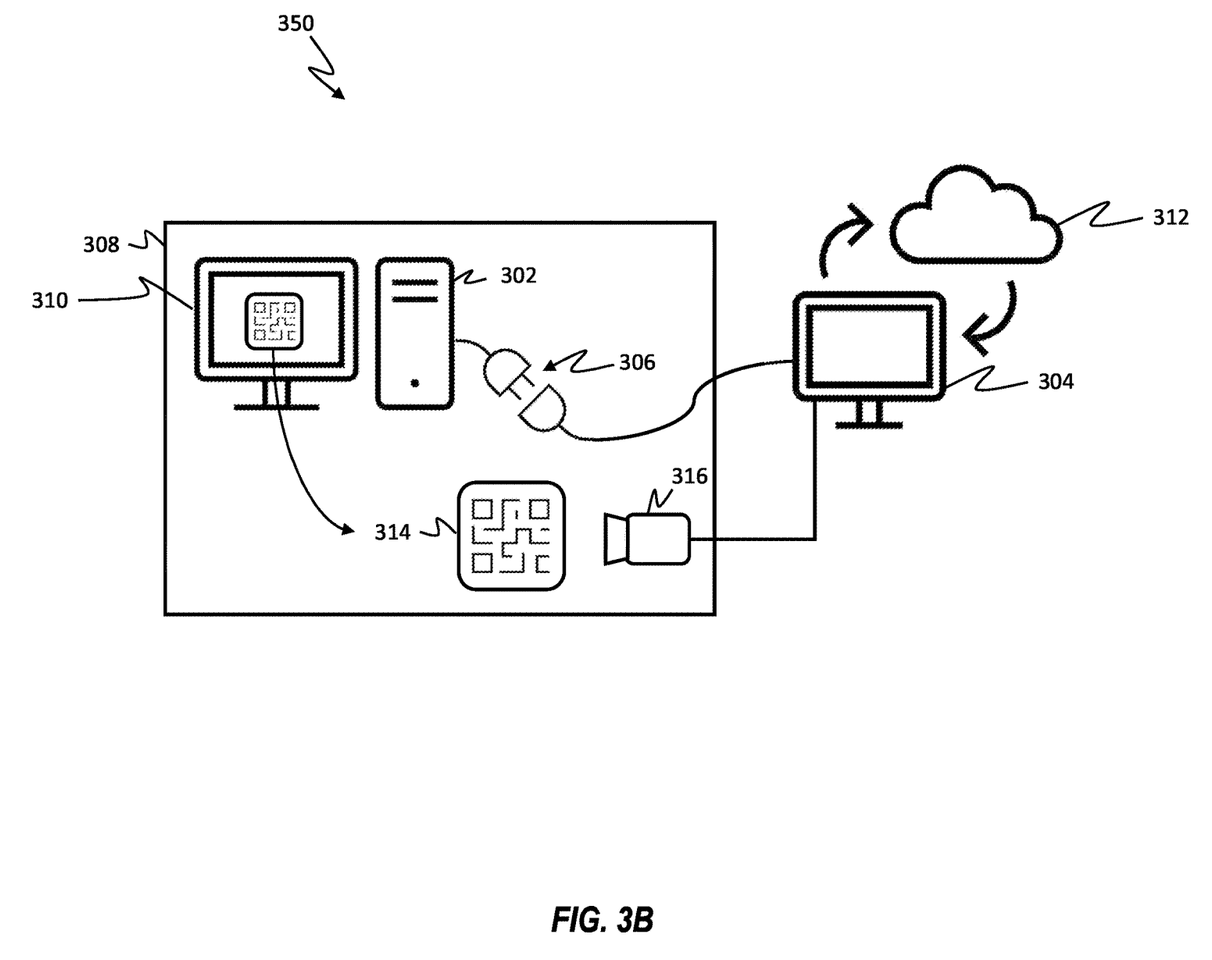

Attention will now be directed to FIGS. 3A and 3B which illustrate various embodiments of a true secure airgap system, wherein some components are labeled with like reference numbers as FIGS. 1-2 and are representative of the corresponding components in FIGS. 1-2. FIG. 3A shows an example embodiment for a true secure airgap system 300 including an air-gapped machine 302 which is connected with an airgap 306 to user machine 304. In some instances, user machine 304 is also connected to a network 312. Airgap 306 is shown in a disconnected state in FIG. 3A. Air-gapped machine 302 is also connected to a display monitor 310 which is configured to display a current status of the air-gapped machine 302, for example, in the form of a visual code 314.

True secure airgap system 300 further includes a camera 316 that is positioned to view and/or record the visual code 314. Where barrier 308 is a physical barrier, a window 318 that is transparent is provided in a wall of barrier 308 to allow the camera 316 to "see" the visual code 314. Barrier 308 provides a secure environment, limiting access to the air-gapped machine 302 to only those users that have the authorization and means of unlocking the secure environment (e.g., unlocking a door of barrier 308). The camera 316 reads the visual code 314 off of the display monitor 310 and transmits the visual code to the user machine 304 (or other administrator device). The administrator can then validate the authenticity of the visual code 314 using cryptographic tools, which is described in further detail in reference to FIG. 5. If an administrator is not stationed remotely, the administrator is able to manually inspect the visual code 314 (if visual code 314 is visible to the human eye) via window 318 without use of the camera, wherein the administrator is able to ascertain the status of the air-gapped machine 302 without having to close the airgap 306.

It should be appreciated that the security of the user machine 304 (and thus the security of the air-gapped machine) is increased when the user machine 304 is configured to receive and authenticate user credentials, wherein only authorized users are able to access the user machine 304. Furthermore, it is anticipated that the secure environment is accessible only to authorized users who have been granted access to the secure environment.

As shown in FIG. 3A, the camera 316 is separated from the air-gapped machine 302 by barrier 308. In some instances, camera 316 is flush with an outer portion of window 318 to ensure that a malicious attacker is prevented from creating a dummy visual code that would possibly induce an administrator into closing the airgap to more thoroughly check or fix the alleged issue of the air-gapped machine 302. Camera 316 is connected to user machine 304 to allow remotely stationed administrators (e.g., user 320) to access the user machine 304 and camera 316 in order to view the visual code 314 from their remote station.

Attention will now be directed to FIG. 3B, wherein true secure airgap system 350 is representative of true secure airgap system 300 and includes like components to FIG. 3A, but wherein the camera 316 is included in the secure location of the air-gapped machine 302 inside the barrier 308. In such configurations, it would be difficult for an attacker to access the camera 316 and tamper with the video or picture feed being sent to the user machine 304.

As shown in FIGS. 3A and 3B, the visual code 314 is configured as a quick response (QR) code. There are many different types of QR codes including: a model 1 QR code, a model 2 QR code, a microQR code, an iQR code, an SQRC, and a frame QR code. While visual code 314 is illustrated as a QR code in FIGS. 3A and 3B, it should be appreciated that any type of visual code that have sufficient lengths to be communicate the various status codes of the air-gapped machine and be read by camera 316 can be implemented into true secure airgap system 300. Examples of different types of visual codes that are usable in true airgap systems disclosed herein include barcodes, JAB code, multi-colored HCC2D codes, PDF417, Aztec or any other visual coding method. Disclosed embodiments are directed primarily to 2D visual code systems, but systems and methods herein are adaptable to 3D visual code systems, such as those used in virtual reality and augmented reality. Optionally, visual code 314 is able to communicate text, images, and/or video that further describe the status of the air-gapped machine 302.

As described above and shown in FIGS. 3A and 3B, airgap 306 is a physical (i.e., mechanical) disconnection of the network 312 from the air-gapped machine 302, wherein a plug is physically pulled out from its corresponding connecting port, that is connected wirelessly or with a wired connection to user machine 304 and/or directly to network 312. It should also be appreciated that camera 316 is configurable to receive visible light as displayed by the display monitor in order to read a visible light QR code. In some embodiments, the camera 316 is a diode that is tuned to capture non-visible light spectrum, such as infrared light or a certain pre-determined range of frequencies, such as certain laser beam frequencies. The air gap 306, however, can also be implemented in software. The machine 302, for example, may close the air gap 306 according to a schedule or in another manner. Typically, the air gap 306 completely prevents external access regardless of how configured.

In a broad sense, the camera 316 is just one example of a receiver included in the true secure airgap system. Thus, the receiver connected to the user machine 304 is configured to receive and convey the status message to the user machine 304 in the medium into which the status message is converted. For example, if the status message is converted into an audio signal, the receiver is configured as an audio recorder.

Cryptography

While the display of a visual code and implementation of a camera allows for an administrator to check the status of the air-gapped machine without closing the airgap, and even check the status remotely, disclosed embodiments are also directed to further ensuring the security of the air-gapped machine by employing cryptographic tools to ensure the integrity of the status messages encoded into the visual codes that are displayed. If an administrator of a true secure airgap system were to only utilize the display monitor and camera to show the output of various commands or status updates of the air-gapped machine, the air-gapped machine is still vulnerable to malicious attackers, since the camera is also connected to a network. For example, a malicious attacker could falsify the visual codes, thereby tricking the camera into reading a false visual code. Therefore, disclosed embodiments are also directed to systems and methods for ensuring that the data transmitted by the visual code originated only from the air-gapped machine, and that it was not tampered with, duplicated, or altered before reaching the camera, or before being transmitted by the camera to the user machine/network.

Figure 4:
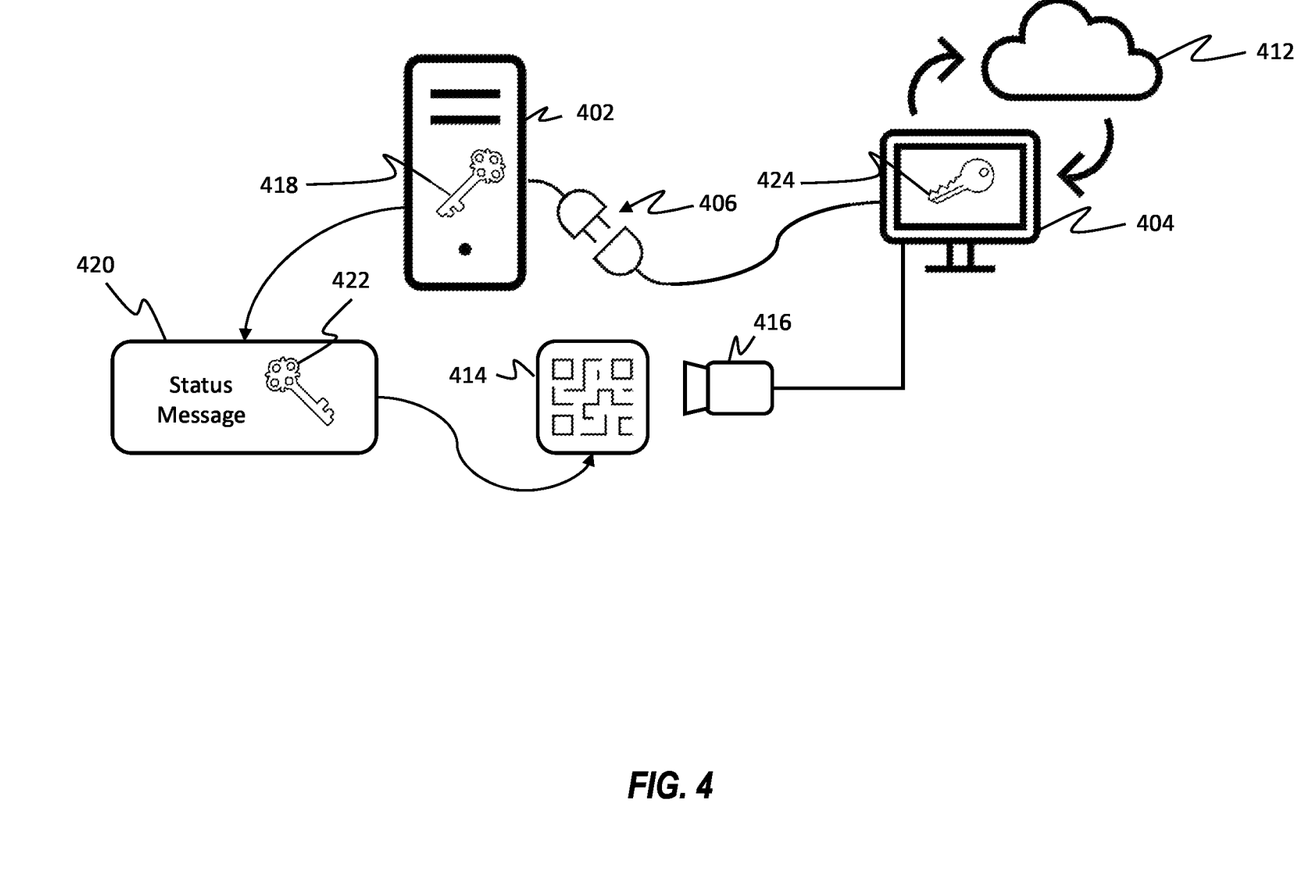
FIG. 4 illustrates an example embodiment of implementing cryptographic tools in a true secure airgap system.

Attention will now be directed to FIG. 4, which illustrates an example embodiment of implementing cryptographic tools in a true secure airgap system. For example, FIG. 4 shows an air-gapped machine 402 disconnected from a user machine 404 and network 412 because of an airgap 406, which is shown in a disconnected state in FIG. 4. As part of an asymmetric cryptographic key-pair to ensure the integrity of a status message 420 (e.g., as encoded into a visual code 414), a private key 418 is stored on the air-gapped machine.

A public key 424, which corresponds to the private key 418, is stored on the user machine 404 which is configured as an administrative machine. Every status message (e.g., status message 420) generated by the air-gapped machine 402 is signed using the private key 418. The status message 420 and signature 422 of the private key 418 are encoded into the visual code 414. This cryptographic signature is like electronically signing a document, wherein a document view can verify that the document was signed by the desired person. Similarly, the cryptographic signature ensures that the air-gapped machine is the true author of the status message.

In an asymmetric cryptographic scheme, only one entity (e.g., the air-gapped machine 402) has access to the private key 418, while the public key 424 is accessible by any person that has been authorized by the administrator to do so. In this manner, any person with access to the public key 424 is able to verify the integrity of the status message 420, but only the owner of the private key 418 is able to cryptographically sign a status message using the private key 418.

After the visual code 414 is received by and transmitted through the camera 416, the signed visual code is received by the user machine 404. An administrative user is then able to use the public key 424 to verify the signature 422 included in the visual code 414 to ensure that the air-gapped machine is the true creator of the status message 420 encoded in the visual code 414, that the content of the visual code is valid and not tampered with and verifies that time of the message creation and transmission. It should be appreciated that any asymmetric cryptography signing method can be used, for example, RSA or ECDSA protocols.

If encryption is used for the status message 420 and/or visual code 414, a second set of keys is provided for encryption. If both the private key 418 and the public key 424 are secure, it is sufficient to ensure that the visual code 414 is verified. While the cryptographic signature is focused on limiting the creation of a message and/or signing of a created message to a single entity using a private key, encryption is focused on limiting the decryption of a message to a single entity (or limited authorized entities). Thus, the signature ensures that the message is authentic, while encryption hides the information from unwanted viewers.

Decrypting an encrypted message allows the owner of the decryption key to decode the visual code 414 and view the original status message. Without the decryption key, an administrative machine or user would not be able to ascertain the meaning of the status message 420 included in the visual code 414. In such configurations, the status message is encrypted with public encryption key (which is published to a public set of users) and then decrypted with a private key that is not published (has only one or a limited authorized set of users). In summary, cryptographic signing adds a signature 422 to the status message 420, while encryption changes the status message 420 to a form that is unreadable to anyone that does not have a private decryption key.

Figure 5:
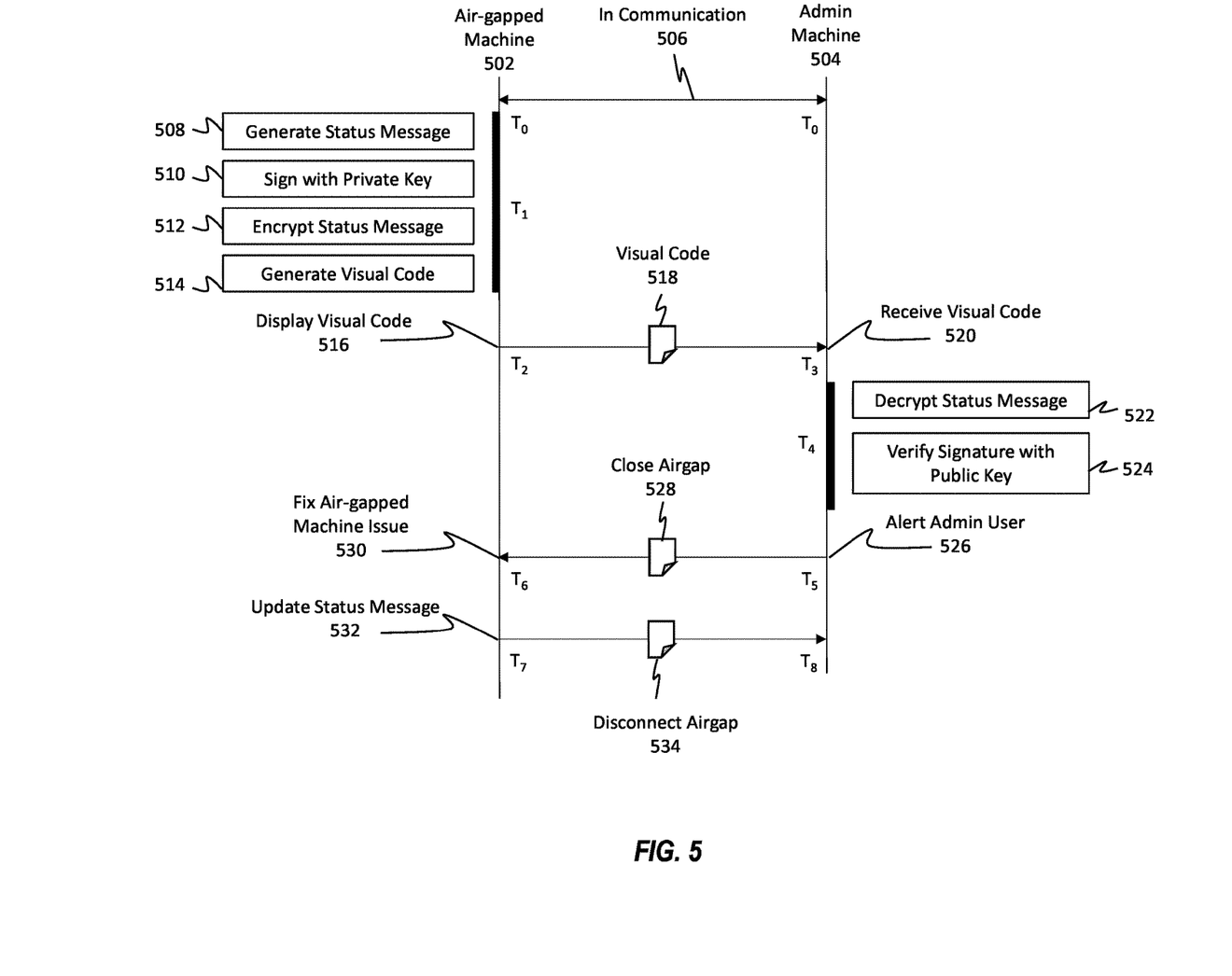
FIG. 5 illustrates an example flow diagram for cryptographically signing and encrypting the visual code to ensure secure access to the visual code.

Attention will now be directed to FIG. 5, which illustrates an example embodiment of cryptographically signing the visual code to ensure its integrity, as well as, encrypting the visual code to restrict viewing access to only authorized parties. While the flow diagram of FIG. 5 includes both techniques for cryptographically signing and encrypting, it should be appreciated that the visual code may only be cryptographically signed, or only encrypted, or both as shown in FIG. 5.

FIG. 5 shows an air-gapped machine 502 (which is representative of air-gapped machine 402) in communication 506 with admin machine 504 (which is representative of user machine 404). The air-gapped machine 502 generates a status message (act 508) and signs the status message with the private key (act 510). Optionally, the status message is encrypted (act 512). Subsequent to at least signing the status message using the private key, the status message and private key signature are included in a visual code 518 which is generated by the air-gapped machine 502 (act 514) and displayed on a display monitor (e.g., display monitor 310) (act 516).

A camera in communication with the admin machine 504 is positioned to obtain an image or recording of the visual code 518, wherein the admin machine 504 receives (i.e., accesses) the visual code (act 520). Subsequent to receiving the visual code 518, the admin machine 504 decrypts the status message included in the visual code, if the status message was encrypted at the air-gapped machine 502 (act 522). The admin machine 504 (and/or a user of the admin machine 504) is able to verify the private key signature of the status message using a public key that is stored on the admin machine 504 (and/or network connected to the admin machine) (act 524).

Once the integrity of the status message has been verified, and if the status message shows a maintenance required status of the air-gapped machine (such an internal software or hardware malfunction, or designated time interval for a data storage back-up), the admin machine 504 alerts the user (i.e., administrator) of the status message. The user is then able to close the airgap (act 528) temporarily to address the issue (act 530), at which point the status message is updated to reflect a normal or fixed status (act 532) and the user is able to disconnect the airgap (act 534). Because the user has already verified the authenticity of the status message via the public key, the user is able to ensure that they are not unnecessarily closing the airgap or being induced by a malicious attacker to close the airgap to expose the air-gapped machine to an attack.

On the other hand, if the signature is not able to be verified or is deemed a false signature, the admin user is alerted (act 526) and is able to investigate whether the status message, the signature, the visual code, the air-gapped machine, or the camera connected to the user machine has been tampered with, or if the visual code contains falsified information.

Figure 6:
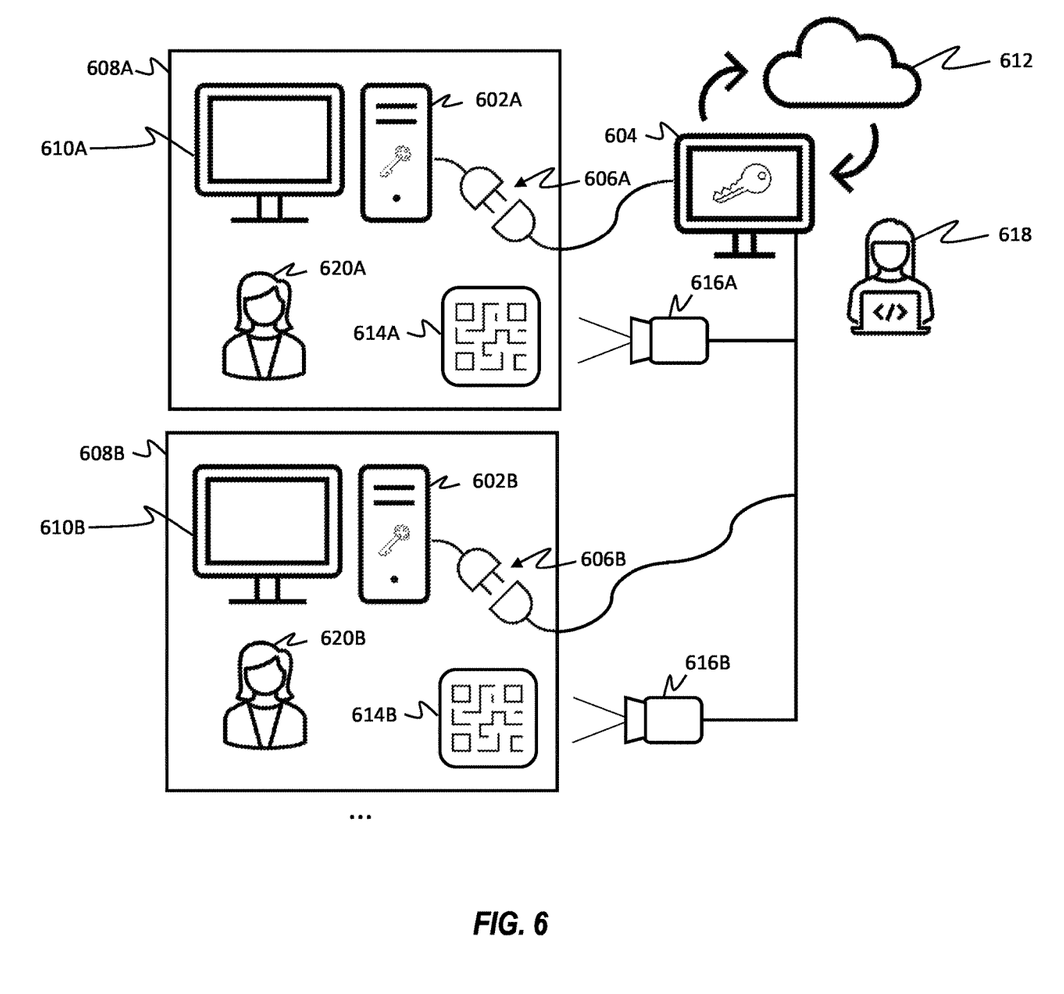
FIG. 6 illustrates an example embodiment of monitoring the status of a plurality of air-gapped machines, such as voting machines, utilizing a plurality of cameras and corresponding visual codes.

Attention will now be directed to FIG. 6, which illustrates an example embodiment of a true secure airgap system implemented in a voting station application. FIG. 6 shows a plurality of voting machines having an air-gapped machine (e.g., air-gapped machine 602A, air-gapped machine 602B) and a display monitor (e.g., display monitor 610A, display monitor 610B) connected to the air-gapped machine which is configured to display a visual code (e.g., visual code 614A, visual code 614B) that communicates a status of the air-gapped machine. The plurality of air-gapped machines is configured to receive user inputs associated with votes from a user (e.g., user 620A, user 620B) and store the user inputs (i.e., votes) until the voting process is completed. Once the voting process is completed, an administrator is able to close the airgap (e.g., airgap 606A, airgap 606B) in order to retrieve the stored votes and transfer them to the user machine 604 in communication with network 612.

In the application of voting machines, it is imperative that the air-gapped machines remain secure throughout the voting process to prevent tampering with the votes. Each air-gapped machine is secured in a secure environment (e.g., secure environment 608A, secure environment 608B). The air-gapped machines periodically or continuously display a visual code that is updated periodically or continuously to display the status of the air-gapped machine. The status messages that are included in the visual codes are signed using private keys stored on the air-gapped machines. A plurality of cameras (e.g., camera 616A, camera 616B) are positioned in view of the visual codes and are able to transmit image data or video data of the visual codes to the user machine 604. An admin (e.g., admin user 618) is then able to monitor the status of each of the voting machines. If a visual code communicates that an air-gapped machine needs attention, the admin uses the public key stored on the user machine 604 to verify the integrity of the status message. This helps to limit the number of times each air-gapped machine must be connected to the network 612 and ensures that a false status message is not acted upon (i.e., closing the airgap).

Example Computer/Computer systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
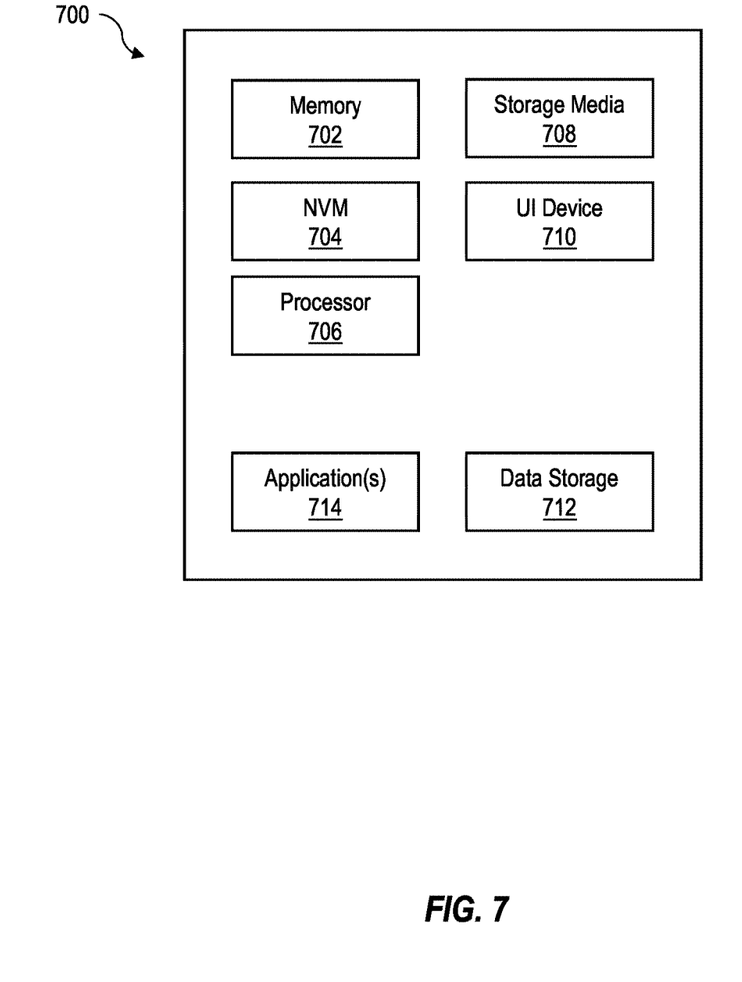
FIG. 7 illustrates an example computer system configured to perform any of the disclosed operations.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) (e.g., NVM 704) such as NVRAM for example, read-only memory (ROM), and persistent memory, one or more hardware processors 706, non-transitory storage media 708, UI device 710, and data storage 712. One or more of the components included in memory 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

EXAMPLE EMBODIMENTS

In view of the foregoing, the present invention may be embodied in multiple different configurations, as outlined above, and as exemplified by the following aspects.

1. A method for securely monitoring an air-gapped machine, the method comprising: generating a status message representing a state of an air-gapped machine; converting the status message to a visual code; displaying the visual code to a display monitor connected to the air-gapped machine; capturing image data of the visual code at a camera connected to a monitoring machine; and transmitting the image data to the monitoring machine, thereby causing the visual code to be accessible by a user of the monitoring machine.

2. The method according to preceding Aspect 1, further comprising: prior to converting the message to the visual code, cryptographically signing the status message using a private key stored on the air-gapped machine such that the visual code includes the status message and a private key signature.

3. The method according to preceding Aspects 1-2, further comprising: subsequent to transmitting the image data to the monitoring machine, verifying the private key signature using a public key stored on the monitoring machine.

4. The method according to preceding Aspects 1-3, further comprising: prior to converting the message to the visual code, encrypting the status message using an encryption key stored on the air-gapped machine.

5. The method according to preceding Aspects 1-4, further comprising: subsequent to transmitting the image data to the monitoring machine, decrypting the status message included in the visual code using a decryption key stored on the monitoring machine.

6. The method according to preceding Aspects 1-5, further comprising: prior to displaying the visual code, encrypting the visual code using an encryption key stored on the air-gapped machine.

7. The method according to preceding Aspects 1-6, further comprising: subsequent to transmitting the image data to the monitoring machine, decrypting the status message included in the visual code using a decryption key stored on the monitoring machine.

8. The method according to preceding Aspects 1-7, wherein the air-gapped machine and display monitor are disposed within a secure environment.

9. The method according to preceding Aspects 1-8, wherein the camera is disposed outside of the secure environment such that the camera is isolated from the air-gapped machine and display monitor.

10. The method according to preceding Aspects 1-9, wherein the camera is also disposed within the secure environment.

11. The method according to preceding Aspects 1-11, wherein the visual code is configured as one or more of the following QR codes: a model 1 QR code, a model 2 QR code, a microQR code, an iQR code, an SQRC, or a frame QR code.

12. The method according to preceding Aspects 1-12, wherein the visual code is configured as a barcode.

13. The method according to preceding Aspects 1-13, wherein the status message communicates to a user of the monitoring machine 14. The method according to preceding Aspects 1-14, further comprising: inspecting the image data of the visual code received by the monitoring machine; determining that the air-gapped machine is functioning sub-optimally; and generating an alert to a user of the monitoring machine that the air-gapped machine likely requires maintenance.

15. The method preceding Aspects 1-15, further comprising: subsequent to verifying the status message, determining that an integrity of the visual code is compromised.

16. One or more hardware storage devices that store instructions that are executable by one or more processors of a computer system to cause the computer system to: generate a status message representing a state of an air-gapped machine; convert the status message to a visual code; display the visual code to a display monitor connected to the air-gapped machine; capture image data of the visual code at a camera connected to a monitoring machine; and transmit the image data to the monitoring machine, thereby causing the visual code to be accessible by a user of the monitoring machine.

17. The one or more hardware storage devices according to preceding Aspect 16, wherein one or more hardware storage devices comprise: a first hardware storage device that is associated with the air-gapped machine and that stores a private key configured to cryptographically sign the status message, and a second hardware storage device that is associated with the monitoring machine and that stores a public key configured to verify the cryptographically signed status message; and wherein the instructions are further executable by the one or more processors of the computer system to further cause the computer system to: prior to converting the status message to the visual code, cryptographically sign the status message with a private key stored; and subsequent to transmitting the image data to the monitoring machine, verify the cryptographically signed status message.

18. The one or more hardware storage devices according to preceding Aspect 16-17, wherein one or more hardware storage devices comprise: a first hardware storage device that is associated with the air-gapped machine and that stores a public encryption key configured to encrypt the status message, and a second hardware storage device that is associated with the monitoring machine and that stores a private decryption key configured to decrypt the encrypted status message; and wherein the instructions are further executable by the one or more processors of the computer system to further cause the computer system to: prior to converting the status message to the visual code, encrypt the status message using the public encryption key; and subsequent to transmitting the image data to the monitoring machine, decrypt the status message using the private decryption key.

19. A computing system configured for securely monitoring a status of an air-gapped machine without closing an airgap, the computing system comprising: an air-gapped machine connectable to a monitoring machine; an airgap between the air-gapped machine and the monitoring machine, the airgap connection being closeable to facilitate communication between the air-gapped machine and monitoring machine; a display monitor in communication with the air-gapped machine, the display monitor configured to display a visual code associated with the status of the air-gapped machine; and a camera in communication with the monitoring machine and disposed in a position relative to the display monitor where the visual code displayed on the display monitor is viewable by the camera, wherein the visual code is transmittable through the camera to the monitoring machine; wherein the air-gapped machine comprises: one or more processors; and one or more hardware storage devices that store one or more computer-readable instructions that are executable by the one or more processors to configure the air-gapped machine to at least: generate a status message that represents a current state of the air-gapped machine; convert the status message to a visual code; and display the visual code on the display monitor such that the visual code is accessible to the monitoring machine through the camera.

20. The computing system according to preceding Aspect 19, wherein the one or more computer-readable instructions are further executable by the one or more processors to further configure the air-gapped machine to: subsequent to generating the status message, cryptographically sign the status message with a private key stored on the air-gapped machine such that the visual code includes the status message and a private key signature that is verifiable by a public key.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for securely monitoring an air-gapped machine, the method comprising:
generating a status message representing a state of an air-gapped machine disposed in a secure environment accessible to only authorized users;
converting the status message to a visual code;
encrypting the visual code using an encryption key stored on the air-gapped machine;
displaying the visual code to a display monitor connected to the air-gapped machine, wherein the splay monitor connected to the a ir achine is inside the secure environment;
capturing image data of the visual code at a camera connected to a monitoring machine, wherein the camera is positioned to prevent an attack from occuring in a line of sight between the camera and the display monitor connected to the air-gapped machine; and
transmitting the image data to the monitoring machine, thereby causing the visual code to be accessible by a user of the monitoring machine; and
decrypting the status message included in the visual code using a decryption key stored on the monitoring machine.

2. The method of claim 1, further comprising:
prior to converting the message to the visual code, cryptographically signing the status message using a private key stored on the air-gapped machine such that the visual code includes the status message and a private key signature.

3. The method of claim 2, further comprising:
subsequent to transmitting the image data to the monitoring machine, verifying the private key signature using a public key stored on the monitoring machine.

4. The method of claim 1, further comprising:
prior to converting the message to the visual code, encrypting the status message using an encryption key stored on the air-gapped machine.

5. The method of claim 4, further comprising:
subsequent to transmitting the image data to the monitoring machine, decrypting the status message included in the visual code using a decryption key stored on the monitoring machine.

6. The method of claim 1, wherein the air-gapped machine and the display monitor are disposed within a secure environment.

7. The method of claim 6, wherein the camera is disposed outside of the secure environment such that the camera is isolated from the air-gapped machine and the display monitor.

8. The method of claim 6, wherein the camera is also disposed within the secure environment.

9. The method of claim 8, wherein the visual code is one of: a model 1 QR code, a model 2 QR code, a microQR code, an iQR code, an SQRC, or a frame QR code.

10. The method of claim 1, wherein the visual code is configured as a barcode.

11. The method of claim 1, wherein the status message communicates the status of the air-gapped machine to a user of the monitoring machine.

12. The method of claim 1, further comprising:
inspecting the image data of the visual code received by the monitoring machine;
determining that the air-gapped machine is functioning sub-optimally; and
generating an alert to a user of the monitoring machine that the air-gapped machine likely requires maintenance.

13. The method of claim 1, further comprising:
determining that an integrity of the visual code is compromised.

14. The method of claim 1, wherein the camera is flush with a window of the secure environment or disposed inside the secure environment.

15. A computing system configured for securely monitoring a status of an air-gapped machine without closing an airgap, the computing system comprising:
an air-gapped machine connectable to a monitoring machine, wherein the air-gapped machine is disposed in a secure environment accessible to only authorized users;
an airgap between the air-gapped machine and the monitoring machine, the airgap connection being closeable to facilitate communication between the air-gapped machine and monitoring machine;
a display monitor in communication with the air-gapped machine, the display monitor configured to display a visual code associated with the status of the air-gapped machine and decrypt a status message included in a visual code using a decryption key stored on the monitoring machine, wherein the display monitor connected to the air gapped machine is inside the secure environment; and
a camera in communication with the monitoring machine and disposed in a position relative to the display monitor where the visual code displayed on the display monitor is viewable by the camera, wherein the visual code is transmittable through the camera to the monitoring machine, wherein the camera is positioned to prevent an attack from occurring in a line of sight between the camera and the display monitor connected to the air-gapped machine;
wherein the air-gapped machine comprises:
one or more processors; and
one or more hardware storage devices that store one or more computer-readable instructions that are executable by the one or more processors to configure the air-gapped machine to at least:
generate the status message that represents a current state of the air-gapped machine;
convert the status message to the visual code;
encrypt the visual code using an encryption key stored on the air-gapped machine; and
display the visual code on the display monitor such that the visual code is accessible to the monitoring machine through the camera.

16. The computing system of claim 15, wherein the one or more computer-readable instructions are further executable by the one or more processors to further configure the air-gapped machine to:
subsequent to generating the status message, cryptographically sign the status message with a private key stored on the air-gapped machine such that the visual code includes the status message and a private key signature that is verifiable by a public key.

* * * * *